United States Patent
Xu et al.

(10) Patent No.: US 12,009,980 B2
(45) Date of Patent: Jun. 11, 2024

(54) METHOD AND DEVICE FOR CONFIGURING TERMINAL POLICY, TERMINAL, BASE STATION AND STORAGE MEDIUM

(71) Applicant: GUANGDONG OPPO MOBILE TELECOMMUNICATIONS CORP., LTD., Guangdong (CN)

(72) Inventors: Yang Xu, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 467 days.

(21) Appl. No.: 17/224,443

(22) Filed: Apr. 7, 2021

(65) Prior Publication Data
US 2021/0226850 A1    Jul. 22, 2021

Related U.S. Application Data

(63) Continuation of application No. PCT/CN2019/085567, filed on May 5, 2019.

(51) Int. Cl.
H04L 41/0893    (2022.01)
H04W 8/22    (2009.01)
H04W 76/10    (2018.01)

(52) U.S. Cl.
CPC .......... *H04L 41/0893* (2013.01); *H04W 8/22* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2012/0289183 A1 | 11/2012 | Tiwari | |
| 2016/0277956 A1* | 9/2016 | Lindheimer | ...... H04W 36/0022 |

(Continued)

FOREIGN PATENT DOCUMENTS

| | | |
|---|---|---|
| CN | 102256218 A | 11/2011 |
| CN | 102780988 A | 11/2012 |

(Continued)

OTHER PUBLICATIONS

EPO, Extended European Search Report for European Application No. 19928264.1, dated Jul. 15, 2021. 13 pages.

(Continued)

*Primary Examiner* — Saumit Shah
(74) *Attorney, Agent, or Firm* — PERKINS COIE LLP

(57) ABSTRACT

A user equipment strategy configuration method and apparatus, a user equipment, a base station, and a storage medium are provided. The method includes: in an idle state, a user equipment sends an RRC establishment request to a base station; the user equipment sends an NAS message to the base station, wherein at least one of the RRC establishment request and the NAS message comprises a preset parameter, and the preset parameter indicates use for configuring a user equipment strategy; and/or in a connected state, send the NAS message to the base station by means of an SRB, wherein the NAS message comprises the preset parameter, and the preset parameter indicates use for configuring the user equipment strategy.

16 Claims, 7 Drawing Sheets

(56) References Cited

U.S. PATENT DOCUMENTS

| | | | | |
|---|---|---|---|---|
| 2017/0303334 A1* | 10/2017 | Kim | ...................... | H04W 74/08 |
| 2018/0289183 A1 | 10/2018 | Karl | | |
| 2019/0116520 A1* | 4/2019 | Chaponniere | ........... | H04W 4/20 |
| 2019/0268827 A1 | 8/2019 | Kim et al. | | |
| 2019/0364495 A1* | 11/2019 | Mildh | ............... | H04W 74/0875 |
| 2020/0128420 A1* | 4/2020 | Ryu | ...................... | H04W 24/10 |
| 2020/0351984 A1* | 11/2020 | Talebi Fard | .......... | H04W 76/40 |
| 2023/0163905 A1* | 5/2023 | Liu | ....................... | H04W 76/25 |
| | | | | 370/329 |

FOREIGN PATENT DOCUMENTS

| | | |
|---|---|---|
| CN | 108809565 A | 11/2018 |
| JP | 2020515159 A | 5/2020 |
| RU | 2638738 C1 | 12/2017 |
| WO | 2018175029 A1 | 9/2018 |
| WO | 2018201816 A1 | 11/2018 |

OTHER PUBLICATIONS

Intel et al. "Clarification on missing trigger of UE Policy Association Establishment" S2-1900422; 3GPP TSG-SA WG2 Meeting #130; Kochi, India, Jan. 21-25, 2019. 17 pages.

Nec et al. "Correction to the Initial NAS message protection" S2-1901250; SA WG2 Meeting #130; Kochi, India; Jan. 21-25, 2019. 21 pages.

Examination Report for European Application No. 19928264.1 dated Feb. 10, 2022. 7 pages.

Examination Report for Indian Application No. 202127019540 dated Feb. 23, 2022. 5 pages with English translation.

Examination Report No. 1 for Australian Application No. 2019444187 dated Feb. 1, 2022. 3 pages.

Notification of Reason for Refusal for Korean Application No. 10-2021-7011597 dated Feb. 16, 2022. 11 pages with English translation.

International Search Report dated Jan. 19, 2020 of PCT/CN2019/085567 (4 pages).

3rd Generation Partnership Project, "Technical Specification Group Services and System Aspects; Procedures for the 5G System; Stage 2 (Release 15)", 3GPP TS 23.502 V15.5.1 (Apr. 2019), 354 pages.

Cisco Systems, "Registration procedure updates due to UE Policy Control Service", S2-1811970; 3GPP TSG-SA WG2 Meeting #129bis, Nov. 26-30, 2018, West Palm Beach, Florida (USA). 22 pages.

Notice of Reasons for Refusal of the Japanese application No. 2021-530939, dated May 27, 2022. 14 pages with English Translation.

SA WG2 "Presentation of TR 23.786 version 2.0.0 "Study on architecture enhancements for EPS and 5G System to support advanced V2X services" for approval", SP-190188; TSG SA Meeting #SP-83; Mar. 20-22, 2019, Shenzhen, China. 2 pages.

Second Office Action of the European application No. 19928264.1, dated Jun. 2, 2022. 7 pages.

Office Action for Russian Application No. 2021113610 dated Oct. 1, 2021. 10 pages with English translation.

First Office Action for Chinese Application No. 202110598893.4 dated Aug. 23, 2022. 15 pages with English translation.

Summons to attend oral proceedings for European Application No. 19928264.1 issued Mar. 1, 2023. 12 pages.

First Substantive Examination Report of the Vietnamese application No. 1-2021-02682, dated Aug. 14, 2023. 4 pages with English translation.

Examiners call and proposed amendments of the European application No. 19928264.1, 1 page.

Brief communication (Oral proceedings) of the European application No. 19928264.1,issued on Sep. 18, 1 page.

First Written Opinion of the Singaporean application No. 11202103939Y issued on Jan. 30, 2024, 9 pages.

* cited by examiner

1

METHOD AND DEVICE FOR CONFIGURING TERMINAL POLICY, TERMINAL, BASE STATION AND STORAGE MEDIUM

CROSS-REFERENCE TO RELATED APPLICATION

This application is a continuation application of International PCT Application No. PCT/CN2019/085567 filed on May 5, 2019, the entire content of which is hereby incorporated by reference.

TECHNICAL FIELD

The present disclosure relates to the field of communication, in particular to a method and device for configuring a terminal policy, a terminal, a base station and a storage medium.

BACKGROUND

In a communication system, when a policy in a terminal (User Equipment, UE) becomes invalid or is missing, the terminal needs to actively request a Packet Control Function (PCF) entity to configure a policy.

In the related art, in a procedure of actively requesting a terminal policy, the terminal sends a request containing a container to an access and mobility management function (AMF) entity through a base station, and the AMF entity sends the request to a PCF entity. After receiving the request sent by AMF entity, the PCF entity adds a terminal policy to the container and sends the container to the AMF entity, and the AMF entity sends the container containing the terminal policy to the terminal so that the terminal can update the policy.

However, in the related art, when congestion occurs in the base station or core network elements, the base station or core network elements cannot process the request sent by the terminal in time, and consequently, the terminal policy cannot be configured in time.

SUMMARY

Implementations of the present disclosure provide a method and device for configuring a terminal policy, a terminal, a base station and a storage medium, which can solve a problem that a terminal policy cannot be configured in time because a base station or a core network element cannot process a request sent by a terminal in time in the related art. Technical solutions are as follows.

In an aspect, an implementation of the present disclosure provides a method for configuring a terminal policy, which is applied to a terminal, and the method includes: in an idle state, sending a radio resource control (RRC) setup request to a base station; sending a non-access stratum (NAS) message to the base station, wherein at least one of the RRC setup request and the NAS message contains a preset parameter, and the preset parameter indicates to configure a terminal policy; and/or, in a connected state, sending a NAS message to a base station through a signaling radio bearer (SRB), wherein the NAS message contains a preset parameter, and the preset parameter indicates to configure a terminal policy.

In another aspect, an implementation of the present disclosure provides a method for configuring a terminal policy, which is applied to a base station, and the method includes: receiving a radio resource control (RRC) setup request sent by a terminal in an idle state; receiving a non-access stratum (NAS) message sent by the terminal, wherein at least one of the RRC setup request and the NAS message contains a preset parameter, and the preset parameter indicates to configure a terminal policy; and/or, receiving a NAS message sent by a terminal in a connected state through a signaling radio bearer (SRB), wherein the NAS message contains a preset parameter, and the preset parameter indicates to configure a terminal policy.

In another aspect, an implementation of the present disclosure provides a method for configuring a terminal policy, which is applied to an access and mobility management function (AMF) entity, and the method includes: receiving an INITIAL UE CONTEXT message sent by a base station, wherein the INITIAL UE CONTEXT message includes a non-access stratum (NAS) message sent by a terminal to the base station; preferentially sending a container in the NAS message to a packet control function (PCF) entity if the INITIAL UE CONTEXT message contains a preset parameter, wherein the preset parameter indicates to configure a terminal policy.

In another aspect, an implementation of the present disclosure provides a method for configuring a terminal policy, which is applied to a packet control function (PCF) entity, and the method includes: receiving a container sent by an access and mobility management function (AMF) entity, wherein the container is located in a non-access stratum (NAS) message sent by a terminal; preferentially writing a terminal policy into the container if the container contains a preset parameter, wherein the preset parameter indicates to configure the terminal policy.

In another aspect, an implementation of the present disclosure provides a method for configuring a terminal policy, which is applied to a terminal, and the method includes: in an idle state, receiving a paging message sent by a base station, wherein the paging message includes a sixth parameter, and the sixth parameter indicates that the paging message is used for configuring a terminal policy; and switching to a connected state according to the paging message.

In another aspect, an implementation of the present disclosure provides a method for configuring a terminal policy, which is applied to a base station, and the method includes: receiving a paging message sent by an access and mobility management function (AMF) entity when a terminal is in an idle state, wherein the paging message includes a sixth parameter, and the sixth parameter indicates to configure a terminal policy; and sending the paging message to the terminal.

In another aspect, an implementation of the present disclosure provides a method for configuring a terminal policy, which is applied to a base station, and the method includes: receiving a first message sent by an AMF entity in a UE configuration update (UCU) procedure, wherein the first message contains a downlink NAS message; and/or, sending a second message to an access and mobility management function (AMF) entity, wherein the second message contains an uplink non-access stratum (NAS) message, and the first message and/or the second message contains a seventh parameter, and the seventh parameter indicates to configure a terminal policy.

In another aspect, an implementation of the present disclosure provides a device for configuring a terminal policy, which is applied to a terminal, and the device includes: a sending module, configured to send, under an idle state, a radio resource control (RRC) setup request to a base station; wherein, the sending module is further configured to send a non-access stratum (NAS) message to the base station, wherein at least one of the RRC setup request and the NAS message contains a preset parameter, and the preset parameter indicates to configure a terminal policy; and/or, the sending module is further configured to send, under a connected state, a NAS message to a base station through a signaling radio bearer (SRB), wherein the NAS message contains a preset parameter, and the preset parameter indicates to configure a terminal policy.

In another aspect, an implementation of the present disclosure provides a device for configuring a terminal policy, which is applied to a base station, and the device includes: a receiving module, configured to receive a radio resource control (RRC) setup request sent by a terminal in an idle state; wherein the receiving module is further configured to receive a non-access stratum (NAS) message sent by the terminal, wherein at least one of the RRC setup request and the NAS message contains a preset parameter, and the preset parameter indicates to configure a terminal policy; and/or, the receiving module is further configured to receive a NAS message sent by a terminal in a connected state through a signaling radio bearer (SRB), wherein the NAS message contains a preset parameter, and the preset parameter indicates to configure a terminal policy.

In another aspect, an implementation of the present disclosure provides a device for configuring a terminal policy, which is applied to an access and mobility management function (AMF) entity, and the device includes: a receiving module, configured to receive an INITIAL UE CONTEXT message sent by a base station, wherein the INITIAL UE CONTEXT message includes a NAS message sent by a terminal to the base station; and a sending module, configured to preferentially send a container in the NAS message to a packet control function (PCF) entity if the INITIAL UE CONTEXT message contains a preset parameter, wherein the preset parameter indicates to configure a terminal policy.

In another aspect, an implementation of the present disclosure provides a device for configuring a terminal policy, which is applied to a packet control function (PCF) entity, and the device includes: a receiving module, configured to receive a container sent by an access and mobility management function (AMF) entity, wherein the container is located in a non-access stratum (NAS) message sent by a terminal; and a processing module, configured to preferentially write a terminal policy into the container if the container contains a preset parameter, wherein the preset parameter indicates to configure the terminal policy.

In another aspect, an implementation of the present disclosure provides a device for configuring a terminal policy, which is applied to a terminal, and the device includes: a receiving module, configured to receive, under an idle state, a paging message sent by a base station, wherein the paging message includes a sixth parameter, and the sixth parameter indicates that the paging message is used for configuring a terminal policy; and a processing module, configured to switch to a connected state according to the paging message.

In another aspect, an implementation of the present disclosure provides a device for configuring a terminal policy, which is applied to a base station, and the device includes: a receiving module, configured to receive a paging message sent by an access and mobility management function (AMF) entity when a terminal is in an idle state, wherein the paging message includes a sixth parameter, and the sixth parameter indicates to configure a terminal policy; and a sending module, configured to send the paging message to the terminal.

In another aspect, an implementation of the present disclosure provides a device for configuring a terminal policy, which is applied to a base station, and the device includes: a receiving module, configured to receive a first message sent by an access and mobility management function (AMF) entity in a UCU procedure, wherein the first message contains a downlink non-access stratum (NAS) message; and/or a sending module, configured to send a second message to an access and mobility management function (AMF) entity, wherein the second message contains an uplink non-access stratum (NAS) message, and the first message and/or the second message contains a seventh parameter, and the seventh parameter indicates to configure a terminal policy.

In another aspect, an implementation of the present disclosure provides a terminal, wherein the terminal includes a processor, a memory, a transmitter and a receiver; wherein the memory is configured to store one or more instructions, which are instructed to be executed by the processor, and the processor is configured to control the transmitter and the receiver to perform the methods for configuring the terminal policy at the terminal side in the above aspects.

In another aspect, an implementation of the present disclosure provides a base station, wherein the base station includes a processor, a memory, a transmitter and a receiver; wherein the memory is configured to store one or more instructions, which are instructed to be executed by the processor, and the processor is configured to control the transmitter and the receiver to perform the methods for configuring the terminal policy at the base station side in the above aspects.

In another aspect, an implementation of the present disclosure provides an AMF entity, wherein the AMF entity includes a processor, a memory, a transmitter and a receiver; wherein the memory is configured to store one or more instructions, which are instructed to be executed by the processor, and the processor is configured to control the transmitter and the receiver to perform the method for configuring the terminal policy at the AMF entity side in the above aspect.

In another aspect, an implementation of the present disclosure provides a PCF entity, wherein the PCF entity includes a processor, a memory, a transmitter and a receiver; wherein the memory is configured to store one or more instructions, which are instructed to be executed by the processor, and the processor is configured to control the transmitter and the receiver to perform the method for configuring the terminal policy at the PCF entity side in the above aspect.

In another aspect, an implementation of the present disclosure provides a computer-readable medium in which one or more instructions are stored, and the instructions are used for performing the method for configuring the terminal policy in any above aspect.

BRIEF DESCRIPTION OF DRAWINGS

In order to describe technical solutions in implementations of the present disclosure more clearly, drawings that need to be used in the description of the implementations will be briefly introduced below. It is apparent that the drawings described below are only some implementations of the present disclosure, and for those of ordinary skill in the art, other drawings may be obtained according to these drawings without paying inventive efforts.

DETAILED DESCRIPTION

In order to make objects, technical solutions and advantages of the present disclosure more clear, the implementations of the present disclosure will be described in further detail below with reference to the accompanying drawings.

The communication system and service scenarios described in the implementations of the present disclosure are for more clearly explaining the technical solutions of the present disclosure, and do not constitute a limitation of the technical solutions provided by the implementations of the present disclosure. Those of ordinary skill in the art should know that with evolution of the communication system and emergence of new service scenarios, the technical solutions provided by the implementations of the present disclosure are also applicable to similar technical problems.

Figure 1:
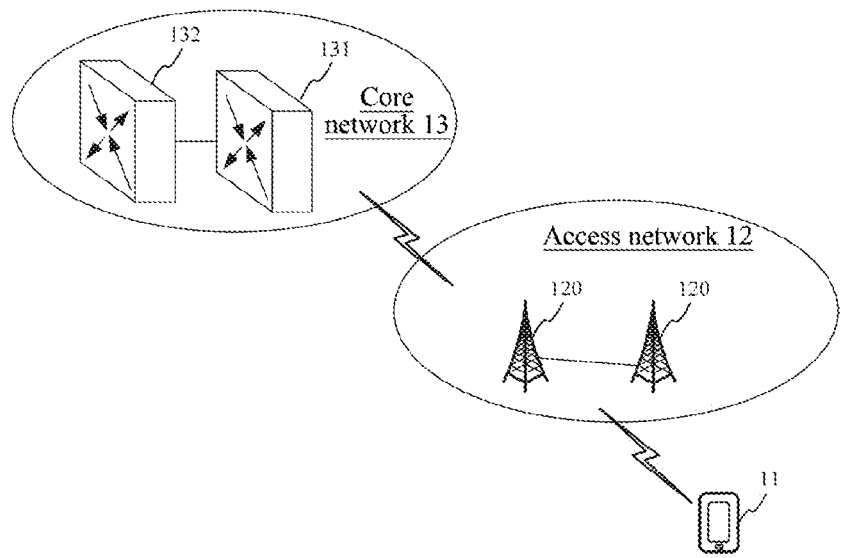
FIG. 1 shows a schematic diagram of an architecture of a communication system provided by an implementation of the present disclosure.

Please refer to FIG. 1, which shows a schematic diagram of an architecture of a communication system provided by an implementation of the present disclosure. The communication system may be a 5G new radio (NR) system. The system includes a terminal 11, an access network 12 and a core network 13.

The terminal 11 may include various devices (such as handheld devices, vehicle-mounted devices, wearable devices, computing devices) with wireless communication capability, or other processing devices connected to a wireless modem, and various forms of user equipment (UE), mobile stations (MSs), terminal devices, and the like. For convenience of description, the above-mentioned devices are all referred to as terminals.

The access network 12 includes a number of access network devices 120. An access network device 120 communicates with the terminal 11 through some air interface technology, such as a Uu interface. The access network device 120 may be a base station which is a device deployed in an access network to provide a wireless communication function for a terminal. The base station may include various forms of macro base stations, micro base stations, relay stations, access points, etc. In systems using different wireless access technologies, names of devices with base station functions may be different, for example, in an LTE system, it is called eNodeB or eNB; and in a 5G NR system, it is called gNodeB or gNB. With the evolution of communication technologies, description for the name "base station" may change. Although the "base station" is used as an example in the implementations of this disclosure, the base station may be understood as an access network device for providing user access functions in various communication systems.

The core network 13 includes a number of core network elements. An access network device 120 and a core network element communicate with each other through some interface technology, such as an NG interface in a New Radio (NR) system. As shown in FIG. 1, the core network 13 includes an access and mobility management function (AMF) entity 131 and a packet control function (PCF) entity 132. The AMF entity 131 is configured to implement functions such as NG1 interface termination, NG2 interface termination, mobility management, SM message routing, access authentication, security anchor point, and security context management. The PCF entity 132 is configured to implement functions such as application and service data flow detection, QoS control, quota management, flow-based charging, data flow diversion management, provision of network selection and mobility management related policies, and UE policy configuration.

In the communication system shown in FIG. 1, the terminal 11 communicates with the AMF entity 131 through an N1 interface, the base station 121 communicates with the AMF entity 131 through an N2 interface, and the AMF entity 131 communicates with the PCF entity 132 through an N15 interface.

Figure 2:
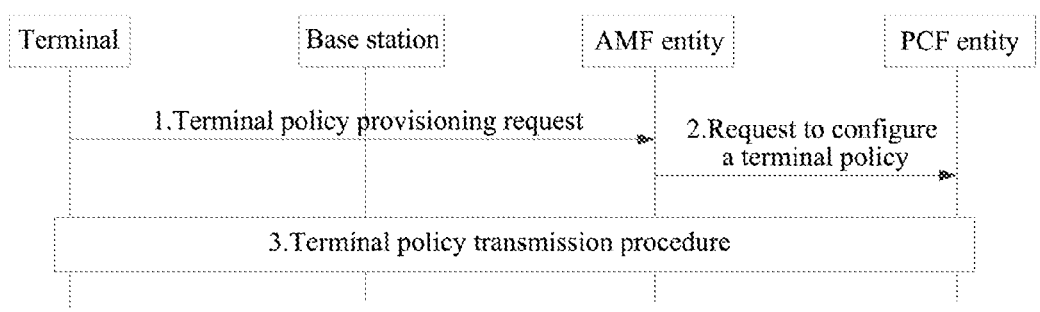
FIG. 2 is a flow chart of a process for a terminal to request configuration of a terminal policy in the related art.

In the communication system shown in FIG. 1, a procedure for a terminal to actively request configuration of a terminal policy is shown in FIG. 2. In act 1, a terminal sends a terminal policy provisioning request to an AMF entity through a base station. In act 2, according to the received request, the AMF entity requests a PCF to configure a terminal policy through an interface (such as an N2 interface) with the PCF entity. In act 3, the PCF entity transmits an updated terminal policy to the terminal, and completes configuration of the terminal policy.

However, when congestion occurs in the base station or core network elements (the AMF entity and PCF entity), the base station may be unable to send the request sent by the terminal to the AMF entity, the AMF entity cannot immediately request the terminal policy from the PCF entity according to the request, and the PCF entity cannot configure the terminal policy and reply in time, as a result, the terminal policy cannot be configured timely, which adversely affects normal use of the terminal policy in case that the terminal policy becomes invalid or is missing.

In an implementation of the present disclosure, when a terminal requests configuration of a terminal policy, a preset parameter is added to an RRC setup request and/or a NAS message, so that a base station and/or a core network element can know according to the preset parameter that the terminal needs configuration of a terminal policy, and thereby preferentially process the RRC setup request and/or the NAS message, thus ensuring timely configuration of the terminal policy when congestion occurs in the base station or core network elements.

Figure 3:
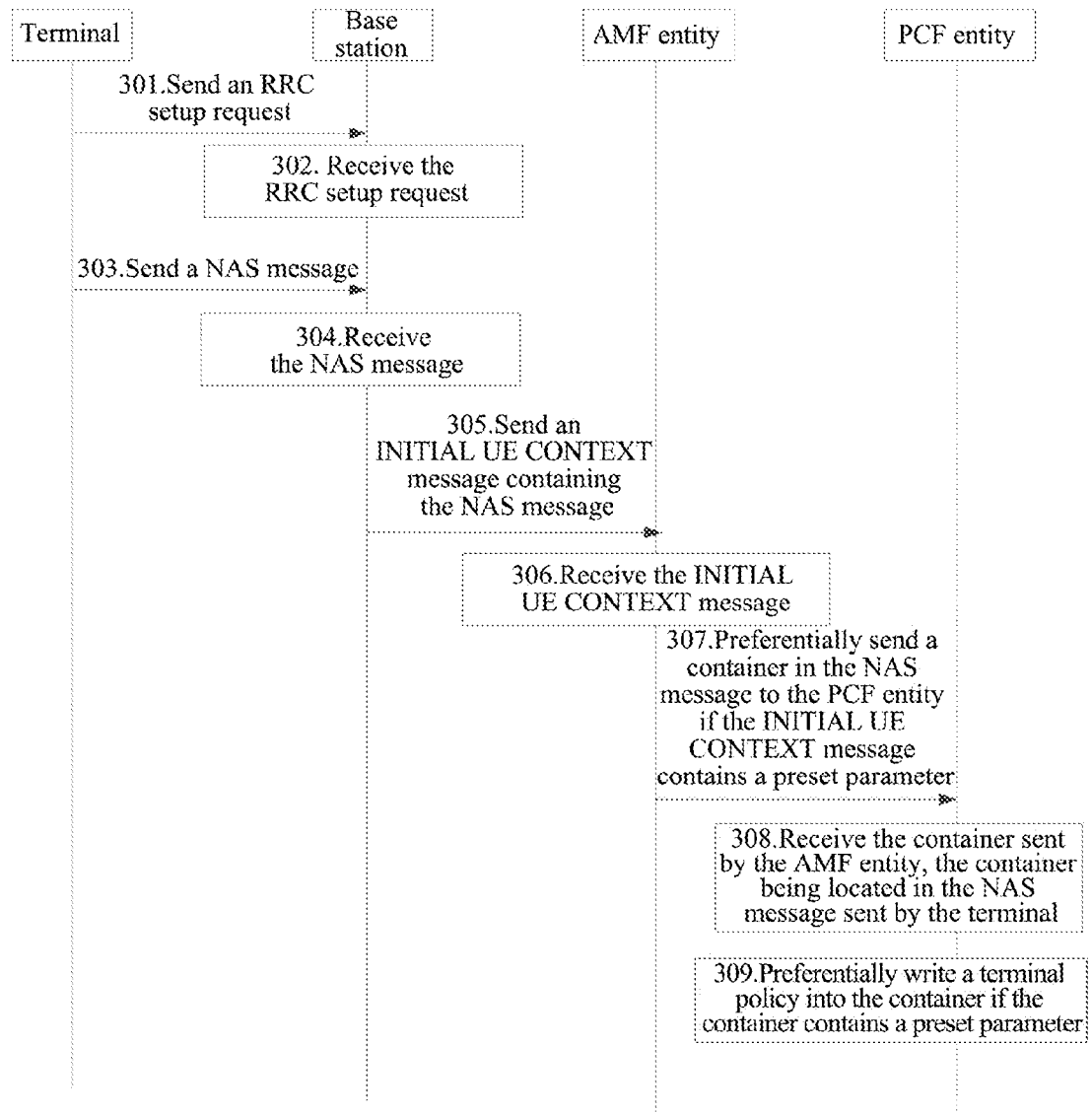
FIG. 3 shows a method flow chart of a method for configuring a terminal policy provided by an implementation of the present disclosure.

Please refer to FIG. 3, which shows a flow chart of a method for configuring a terminal policy provided by an implementation of the present disclosure. In the implementation, the method is applied to the communication system shown in FIG. 1 as an example for illustration. The method includes the following acts 301 to 309.

In act 301, a terminal in an idle state sends an RRC setup request to a base station.

Optionally, in the idle state, the terminal sends the RRC setup request to the base station through an access stratum (AS), wherein the RRC setup request is used for requesting to establish, resume or reestablish an RRC connection.

Optionally, the RRC setup request includes a preset parameter which is used for indicating that a cause for establishing an RRC connection is to configure a terminal policy.

In act 302, the base station receives the RRC setup request sent by the terminal.

Optionally, the base station receives the RRC setup request sent by the terminal on the AS, and establishes an RRC connection with the terminal, resumes an RRC connection with the terminal or reestablishes an RRC connection with the terminal according to the RRC setup request.

Optionally, when the RRC setup request contains a preset parameter, the base station determines that an aim of establishing the RRC connection is to request a terminal policy, and thus preferentially processes the RRC setup request.

In act 303, the terminal sends a NAS message to the base station.

After establishing the RRC connection, the terminal sends the NAS message to the base station. The NAS message is a message delivered between the terminal and the AMF entity of the core network element and transmitted transparently at a base station side. The NAS message may be at least one of a Service Request message, a Registration Request message or a new NAS message.

Optionally, the NAS message is contained in an RRC Setup Complete message sent by the terminal to the base station.

Optionally, the NAS message contains a preset parameter which is used for indicating to configure a terminal policy.

In act 304, the base station receives the NAS message sent by the terminal.

Optionally, the base station receives the RRC Setup Complete message sent by the terminal, and obtains the NAS message contained therein.

In act 305, the base station sends an INITIAL UE CONTEXT message to an AMF entity, and the INITIAL UE CONTEXT message contains the NAS message.

Optionally, if the NAS message is contained in the RRC Setup Complete message, after receiving the RRC Setup Complete message, the base station strips off an AS message in the RRC Setup Complete message to obtain a NAS message of a NAS, and re-encapsulates the NAS message as an INITIAL UE CONTEXT message.

In act 306, the AMF entity receives the INITIAL UE CONTEXT message sent by the base station.

In act 307, if the INITIAL UE CONTEXT message contains a preset parameter, the AMF entity preferentially sends a container in the NAS message to a PCF entity.

Optionally, the NAS message contains a container which contains a message delivered between the terminal and a core network element PCF. Accordingly, the AMF entity transmits transparently the container in the NAS message to the PCF entity, being unaware of a content contained in the container.

Optionally, the preset parameter is located in the NAS message, and/or in a portion other than the NAS message in the INITIAL UE CONTEXT message, and the preset parameter is used for indicating to configure a terminal policy.

In a possible implementation, the AMF entity determines that the NAS message is used for requesting to configure the terminal policy according to the preset parameter in the INITIAL UE CONTEXT message, and thus sends preferentially the container in the NAS message to the PCF entity.

In act 308, the PCF entity receives the container sent by the AMF entity, and the container is located in the NAS message sent by the terminal.

In act 309, if the container contains a preset parameter, the PCF entity preferentially writes a terminal policy into the container.

Optionally, to enable the PCF entity to preferentially configure the terminal policy for the terminal, the container of the NAS message may contain a preset parameter; accordingly, when recognizing that the container contains the preset parameter, the PCF entity preferentially writes the terminal policy into the container.

To sum up, in the implementation of the present disclosure, when a terminal requests configuration of a terminal policy, a preset parameter is added to an RRC setup request and/or a NAS message, so that a base station and/or a core network element can know according to the preset parameter that the terminal needs configuration of the terminal policy, and thereby preferentially process the RRC setup request and/or the NAS message, thus ensuring timely configuration of the terminal policy when congestion occurs in the base station or core network elements.

It should be noted that a procedure for a terminal in an idle state to request configuration of a terminal policy is taken as an example to illustrate the implementation shown in FIG. 3. In other possible implementations, when a terminal is in a connected state, the terminal sends a NAS message containing a preset parameter (indicating to configure the terminal policy) to a base station through an SRB. Accordingly, the base station receives the NAS message sent by the terminal through the SRB and further sends the NAS message to a core network element to complete configuration of the terminal policy, which is not repeatedly described in this implementation.

Figure 4:
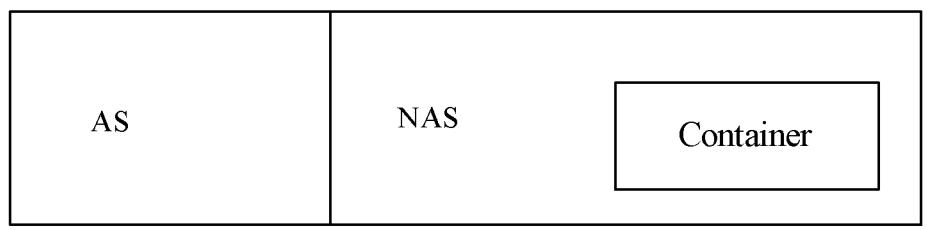
FIG. 4 is a schematic diagram of structure of a data packet exchanged between a terminal and a network side.

In a possible implementation, in the procedure of requesting configuration of the terminal policy, structure of a data packet exchanged between a terminal and a network side is shown in FIG. 4. Herein, an AS includes a message delivered between the terminal and the base station, a NAS includes a message delivered between the terminal and the AMF entity, and a container includes a message delivered between the terminal and the PCF entity. Accordingly, the preset parameter indicating to configure the terminal policy may be set in at least one of the following locations:
1. AS (indicating a base station to preferentially process);
2. NAS (indicating an AMF entity to preferentially process);
3. Container (indicating a PCF entity to preferentially process).

Setting modes of the preset parameter under various conditions are described schematically and respectively below.
1. AS Optionally, the preset parameter includes a first parameter indicating that a cause for establishing an RRC connection is to configure a terminal policy, and the first parameter is contained in an RRC setup request sent by a terminal.

In a possible implementation, the RRC setup request includes an EstablishmentCause field, and the first parameter is contained in the EstablishmentCause field.

With regard to an obtaining mode of the first parameter, optionally, the first parameter is determined by the NAS of the terminal and is indicated to the AS.

In a possible implementation, an access identifier, an access category and an RRC establishment cause (i.e., the first parameter) are newly added to an access category table of a terminal. When a service needs establishment of an RRC connection to send a NAS message to request a terminal policy, after receiving an access identifier sent by the service, the NAS searches for a corresponding access category in the access category table according to the access identifier, and determines an RRC establishment cause corresponding to the access category, thus indicates the RRC establishment cause to the AS. As a first parameter, the RRC establishment cause is added to the RRC setup request by the AS.

In an exemplary example, the Access Category table is shown in table 1.

TABLE 1

| Access identifier | Access category | RRC establishment cause |
|---|---|---|
| 0 | 0 (= MT_acc) | mt-Access |
| | 1 (= delay tolerant) | Not applicable (NOTE 1) |
| | 2 (= emergency) | emergency |
| | 3 (= MO_sig) | mo-Signaling |
| | 4 (= MO MMTel voice) | mo-VoiceCall |
| | 5 (= MO MMTel video) | mo-VideoCall |
| | 6 (= MO SMS and SMSoIP) | mo-SMS |
| | 7 (= MO_data) | mo-Data |
| 1 | Any category | mps-Priority Access |
| 2 | Any category | mcs-Priority Access |
| X | Terminal policy configuration | PolicyRequest |
| 11,15 | Any category | highPriority Access |
| 12,13,14, | Any category | highPriority Access |

X is a newly-added access identifier (different from existing access identifiers, such as 3, 4, 10, etc.), the terminal policy configuration is a newly-added access category (different from existing access categories), and the PolicyRequest is a newly-added RRC establishment cause.

Optionally, after the base station receives the RRC setup request, when the base station detects that a value of the establishment cause field in the RRC setup request is the first parameter, the base station determines that an aim of the terminal to establish an RRC connection is to configure a terminal policy, and thus preferentially responds to the RRC setup request and establishes an RRC connection with the terminal.

By carrying the first parameter in the RRC setup request, the base station in a congestion or overload state can still establish an RRC connection for the terminal in time, improving efficiency of subsequent terminal policy configuration and avoiding a problem that the terminal policy is not configured in time because the RRC connection is not established in time.
2. NAS To enable the AMF entity to know that the NAS message sent by the terminal is used for requesting configuration of a terminal policy, optionally, the NAS message sent by the terminal (other than a container in the NAS message) contains a preset parameter. For different NAS messages, setting modes and quantities of the preset parameters are different.

In a possible implementation, if the terminal adopts an existing NAS message (such as a ServiceRequest), the preset parameter includes a third parameter, and the third parameter is located in a Service Type field of the NAS message (located in a header of the NAS message). Accordingly, when the AMF entity reads a value of the Service Type field in the header of the NAS message being a third parameter, the AMF entity determines that the NAS message is used for configuring the terminal policy, and thus preferentially processes the NAS message.

In an exemplary example, taking the NAS message being a ServiceRequest message as an example, the value of the Service Type field in the ServiceRequest message is shown in table 2.

TABLE 2

| Value | Service type |
|---|---|
| 0000 | Signaling |
| 0001 | Data |
| 0010 | mobile terminated services |
| 0011 | emergency services |
| 0100 | emergency services fallback |
| 0101 | high priority access |
| 0110 | unused; shall be interpreted as "signaling", if received by the network |
| 0111 | unused; shall be interpreted as "signaling", if received by the network |
| 1000 | unused; shall be interpreted as "signaling", if received by the network |
| 1001 | unused; shall be interpreted as "data", if received by the network |
| 1010 | unused; shall be interpreted as "data", if received by the network |
| 1011 | unused; shall be interpreted as "data", if received by the network |
| 1100 | PolicyRequest |

Herein, "PolicyRequest" and "1100" are respectively a newly-added service type and a value of the newly-added service type. The AMF entity determines that the ServiceRequest message is used for configuring the terminal policy when obtaining the value of the Service Type field being 1100.

Of course, in addition to the value of the newly-added Service Type field, an unused value can also be used, which is not limited by the implementations of the present disclosure.

In another possible implementation, if the terminal adopts a new NAS message (neither a ServiceRequest message nor a RegistrationRequest message), the preset parameter includes a fourth parameter, and the fourth parameter is located in a Message Type field (located in a header of the NAS message) of the new NAS message. Accordingly, when the AMF entity reads a value of the Message Type field in the header of the NAS message being the fourth parameter, the AMF entity determines that the NAS message is used for configuring the terminal policy, and thus preferentially processes the NAS message.

In an exemplary example, a value range of the Message Type field of the existing NAS message is 0100000 to 01101000, and the value of the Message Type field of the new NAS messages (such as PolicyRequest) may be 01101001 (i.e., the fourth parameter) or any other unused value. Implementations of the present disclosure do not limit the specific value of the fourth parameter.

Of course, when the new NAS message is adopted, in addition to setting the fourth parameter in the Message Type field, a third parameter may also be set in the Service Type field of the new NAS message, that is, the NAS message contains both the third parameter and the fourth parameter. Accordingly, the AMF entity may determine to preferentially process the NAS message according to the third parameter and the fourth parameter. The implementations of the present disclosure are not limited thereto.

In a possible implementation, in the implementation shown in FIG. 3, if the RRC setup request sent by the terminal to the base station contains the first parameter, the INITIAL UE CONTEXT message sent by the base station to the AMF entity in the above act 305 contains the first parameter in addition to the NAS message. Accordingly, according to the first parameter and/or the third parameter and/or the fourth parameter in the INITIAL UE CONTEXT message, the AMF entity may determine whether to preferentially process the INITIAL UE CONTEXT message.

By adding the third parameter and/or the fourth parameter to the NAS message, the AMF entity in a congested or overloaded state can still preferentially and transparently transmit the container in the NAS message to the PCF entity, thereby improving efficiency of subsequent terminal policy configuration and avoiding a problem that the terminal policy is not configured in time because the AMF entity does not process the message in time.

3. Container

In order to enable the PCF entity to know that a container transmitted transparently by the terminal to the PCF entity is used for requesting to configure a terminal policy, so as to write terminal policy into the container preferentially, optionally, the container of the NAS message sent by the terminal contains a preset parameter which is a fifth parameter.

With regard to a setting mode of the fifth parameter, in a possible implementation, a field value (i.e., the fifth parameter) is newly added to the existing field of the container. The terminal writes the fifth parameter in the existing field when it is needed to request configuration of a terminal policy.

In an exemplary example, a value of a UE policy delivery message type field in the container is shown in table 3.

TABLE 3

| Value | Usage |
| --- | --- |
| 00000000 | Reserved |
| 00000001 | MANAGE UE POLICY COMMAND message |

TABLE 3-continued

| Value | Usage |
| --- | --- |
| 00000010 | MANAGE UE POLICY COMPLETE message |
| 00000011 | MANAGE UE POLICY COMMAND REJECT message |
| 00000100 | UE STATE INDICATION message |
| 00000101 | POLOCY REQUEST |

Herein the value "00000101" is a newly-added value (the fifth parameter) of the UE policy delivery message type field, and is used for indicating that the container is used for configuring a terminal policy.

After receiving the container sent by AMF entity, if reading a value of a predetermined field in the container being the fifth parameter, the PCF entity knows that a usage of the container is to request a terminal policy, and thus preferentially processes the request and writes the terminal policy into the container.

By adding the fifth parameter to the container of the NAS message, the PCF entity in a congestion or overload state can still write the terminal policy into the container preferentially, thus avoiding a problem that the terminal policy is not configured in time because the PCF entity does not process the message in time.

Figure 5:
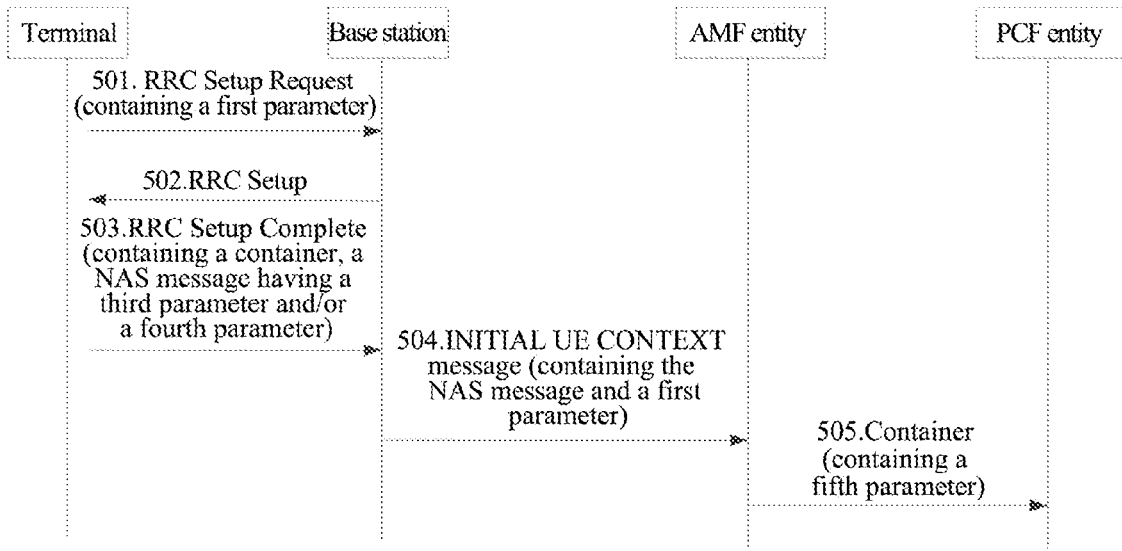
FIG. 5 shows a method flow chart of a method for configuring a terminal policy provided by an implementation of the present disclosure.

In an exemplary example, a procedure for a terminal to actively request configuration of a policy is shown in FIG. 5.

In act 501, a terminal sends an RRC Setup Request message to a base station, wherein the RRC Setup Request message contains a first parameter.

In act 502, the base station establishes an RRC connection with the terminal.

As the RRC Setup Request message contains the first parameter indicating to configure a terminal policy, the base station preferentially processes the RRC Setup Request message and establishes an RRC connection with the terminal.

In act 503, the terminal sends an RRC Setup Complete message to the base station, where the RRC Setup Complete message contains a NAS message, and the NAS message contains a container to be transmitted transparently by the terminal to a PCF entity, and a third parameter and/or a fourth parameter.

In act 504, the base station sends an INITIAL UE CONTEXT message to an AMF entity, where the INITIAL UE CONTEXT message contains the NAS message and the first parameter in the RRC Setup Request message.

In act 505, the AMF entity sends the container in the NAS message to the PCF entity, where the container contains a fifth parameter.

As the NAS message contains the third parameter and/or the fourth parameter and the first parameter indicating to configure the terminal policy, the AMF entity preferentially processes the NAS message and sends the container in the NAS message to the PCF entity.

Accordingly, as the container contains the fifth parameter indicating to configure the terminal policy, the PCF entity preferentially writes a terminal policy into the container and transmits transparently the container in which the terminal policy is rewritten back to the terminal.

In the above exemplary example, by adding a parameter indicating to configure the terminal policy to the AS, NAS and container, the base station, AMF entity and PCF entity can preferentially process messages, and especially when congestion occurs in the base station and core network elements, timely configuration of the terminal policy can be ensured.

In order to inform a network side what policy information is stored locally in the terminal, so that the network side can configure a policy for the terminal according to the stored policy information in the terminal, optionally, during a procedure for the terminal to request configuration of the terminal policy, the container transparently transmitted to the PCF further contains a policy identifier. For example, the policy identifier may be a Policy Section Identifier (PSI).

However, a correspondence relationship between policy identifiers and policy information is not unique, for example, for terminal A, policy identifier 1 corresponds to policy message 1, however for terminal B, policy identifier 1 corresponds to policy message 2. Especially, after the Subscriber Identity Module (SIM) card of the terminal is replaced, the policy information stored in the terminal cannot be used any longer.

In order to prevent an improper PSI in the container from affecting the PCF entity to configure the terminal policy, in a possible implementation, when the SIM card of the terminal is unchanged, the container of the NAS message contains a policy identifier which is used for indicating policy information and/or a policy type stored locally in the terminal; when the SIM card of the terminal is changed, the policy identifier and the policy information corresponding to the policy identifier stored locally in the terminal are cleared, and the container of the NAS message does not contain a policy identifier.

Accordingly, after obtaining the container transparently transmitted by the terminal, the PCF entity detects whether the container contains a policy identifier. If yes, the PCF entity configures a terminal policy for the terminal based on the policy identifier stored in the terminal (the terminal policy stored in the terminal may be configured without repetition). If not, the PCF entity reconfigures a complete terminal policy for the terminal.

Figure 6:
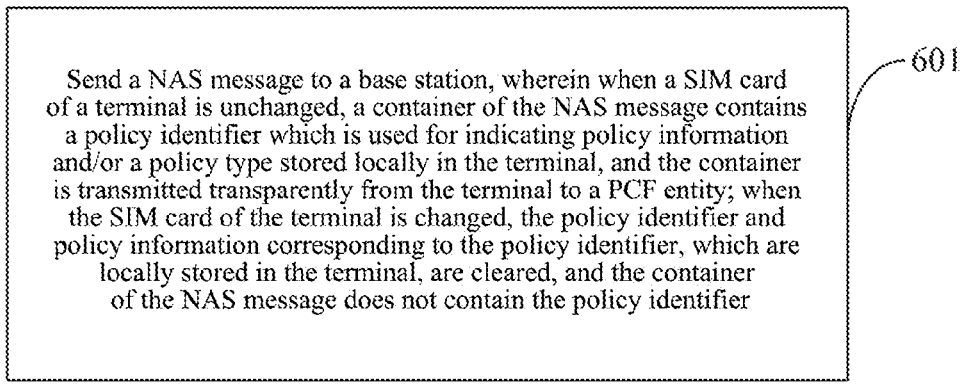
FIG. 6 shows a method flow chart of a method for configuring a terminal policy provided by another implementation of the present disclosure.

Please refer to FIG. 6, which shows a flow chart of a method for configuring a terminal policy provided by another implementation of the present disclosure. In the implementation, the method is applied to the communication system shown in FIG. 1 as an example for illustration. The method includes the following act 601.

In act 601, a NAS message is sent to a base station, when a SIM card of a terminal is unchanged, a container of the NAS message contains a policy identifier which is used for indicating policy information and/or a policy type stored locally in the terminal, and the container is transmitted transparently from the terminal to a PCF entity; when the SIM card of the terminal is changed, the policy identifier and policy information corresponding to the policy identifier, which are locally stored in the terminal, are cleared, and the container of the NAS message does not contain the policy identifier.

The NAS message may be a registration request message sent for a first time or a policy configuration request message (requesting to configure a terminal policy).

Figure 7:
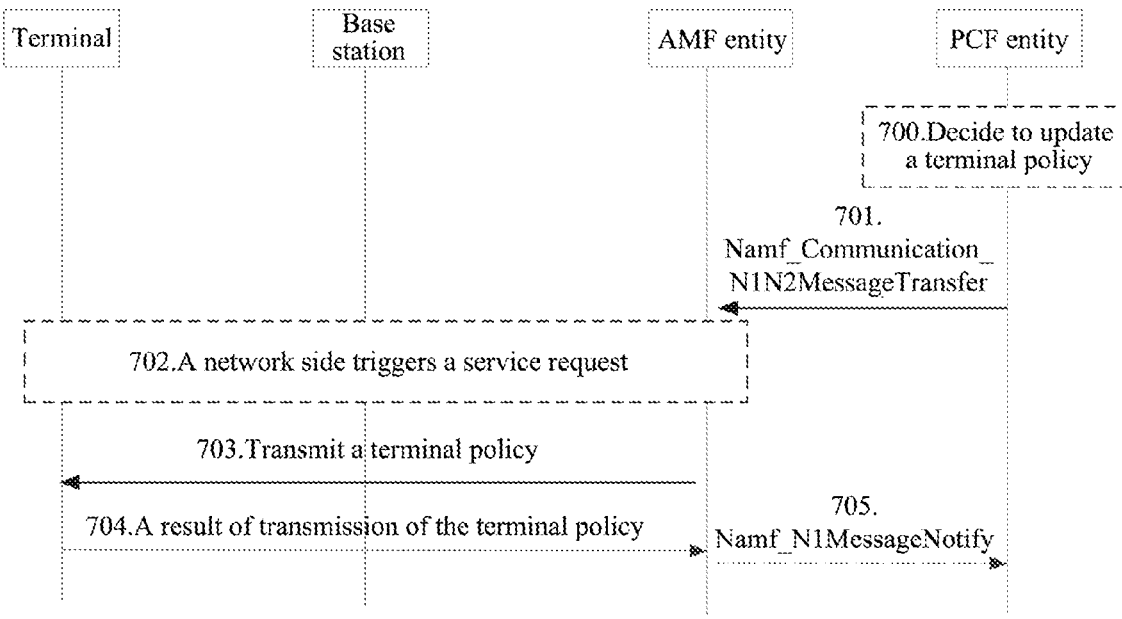
FIG. 7 is a flow chart of a UCU procedure.

The above implementations are all used to describe the procedure for the terminal to actively request configuration of the terminal policy, however in a UCU procedure defined by 3GPP, a network side can also actively initiate terminal policy configuration. Schematically, a UCU procedure is shown in FIG. 7.

In act 700, a PCF entity decides to update a terminal policy.

In act 701, the PCF entity sends a message (Namf_Communication_N1N2MessageTransfer) to an AMF entity.

In act 702, a network side triggers a terminal to initiate a service request (when the terminal is in an idle state).

In act 703, the AMF entity transmits a terminal policy to the terminal.

The PCF entity writes an updated terminal policy into a container and sends the container to the AMF entity, and the AMF entity sends the container to the terminal through a NAS message.

In act 704, the terminal feeds back a result of transmission of the terminal policy to the AMF entity.

In act 705, the AMF entity feeds back a message (Namf_N1MessageNotify) to the PCF entity.

In the above UCU procedure, as a cause of "UE Policy Container" is introduced into a downlink NAS message and an uplink NAS message, the AMF entity and the terminal can be aware that the NAS message is used for configuring the terminal policy.

However, for the base station, because the downlink NAS message and the uplink NAS message are transmitted transparently at the base station, the base station cannot know a usage of the NAS message, as a result, when congestion or overload occurs in the base station, the base station cannot transmit transparently the NAS message in time and terminal policy configuration is adversely affected.

To solve the above problem, in a possible implementation, in the UCU procedure, a parameter indicating to configure a terminal policy is set in a message exchanged between the AMF entity and the base station, so that the base station can be aware that the NAS message is used for configuring the terminal policy, and then process the message preferentially.

Figure 8:
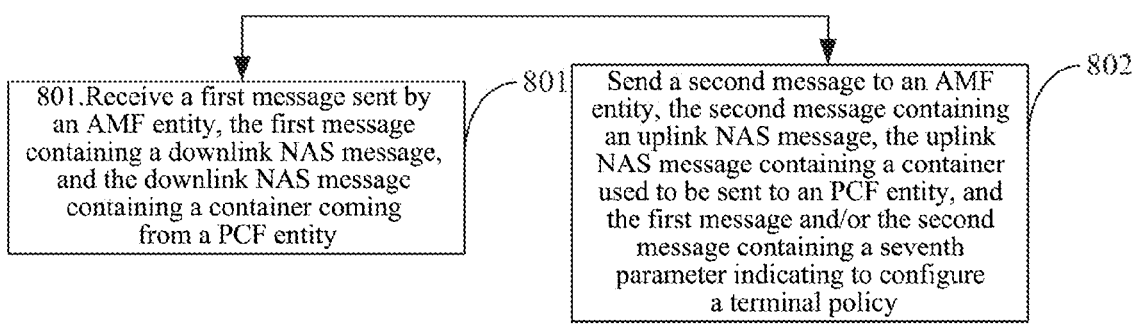
FIG. 8 shows a method flow chart of a method for configuring a terminal policy provided by another implementation of the present disclosure.

Please refer to FIG. 8, which shows a flow chart of a method for configuring a terminal policy provided by another implementation of the present disclosure. In the implementation, the method is applied to the base station in the communication system shown in FIG. 1 as an example for illustration. The method includes the following acts 801 to 802.

In act 801, a first message sent by an AMF entity is received, the first message contains a downlink NAS message, and the downlink NAS message contains a container coming from a PCF entity.

In act 802, a second message is sent to the AMF entity, the second message contains an uplink NAS message, the uplink NAS message contains a container used to be sent to the PCF entity, and the first message and/or the second message contains a seventh parameter indicating to configure a terminal policy.

The container in the downlink NAS message is transmitted transparently from the PCF entity to a terminal, and the container in the uplink NAS message is transmitted transparently from the terminal to the PCF entity.

Optionally, the first message is a Downlink NAS Transport message sent by the AMF entity to the base station through an N2 interface, and the second message is an Uplink NAS Transport message sent by the base station to the AMF entity through an N2 interface. Accordingly, the downlink NAS message is located in a NAS-PDU of the Downlink NAS Transport message, and the uplink NAS message is located in a NAS-PDU of the Uplink NAS Transport message.

With regard to a setting mode of the seventh parameter, in a possible implementation, the seventh parameter is located in a Message Type field of the first message and/or the second message; or, the seventh parameter is located in a newly-added field of the first message and/or the second message.

In an exemplary example, the first message is a Downlink NAS Transport message, and a message format of the first message is shown in table 4.

TABLE 4

| IE/Group Name | Presence | Range | IE type and reference | Semantics description | Criticality | Assigned Criticality |
|---|---|---|---|---|---|---|
| Message Type (seventh parameter) | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.22 | | YES | reject |
| RAN Paging Priority | O | | 9.3.3.15 | | YES | ignore |
| NAS-PDU | M | | 9.3.3.4 | | YES | reject |
| Mobility Restriction List | O | | 9.3.1.85 | | YES | ignore |
| Index to RAT/Frequency Selection Priority | O | | 9.3.1.61 | | YES | ignore |
| UE Aggregate Maximum Bit Rate | O | | 9.3.1.58 | | YES | ignore |
| Allowed NSSAI | O | | 9.3.1.31 | | YES | reject |
| Seventh parameter | | | | Indicate that the message is used for configuring a terminal policy | | |

The seventh parameter may be located in the Message Type field or a newly-added field of the Downlink NAS Transport message.

In an exemplary example, the second message is an Uplink NAS Transport message, and a message format of the second message is shown in table 5.

TABLE 5

| IE/Group Name | Presence | Range | IE type and reference | Semantics description | Criticality | Assigned Criticality |
|---|---|---|---|---|---|---|
| Message Type (seventh parameter) | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| NAS-PDU | M | | 9.3.3.4 | | YES | reject |
| User Location Information | M | | 9.3.1.16 | | YES | ignore |
| Seventh parameter | | | | Indicate that the message is used for configuring a terminal policy | | |

The seventh parameter may be located in the Message Type field or a newly-added field of the Uplink NAS Transport message.

Optionally, the seventh parameter in the first message is added by the AMF entity according to a first indication parameter coming from a PCF entity. For example, the Namf_Communication_N1N2MessageTransfer sent by the PCF entity to the AMF entity contains the first indication parameter.

Optionally, the seventh parameter in the second message is added by the base station according to a second indication parameter coming from a terminal. In a possible implementation, the second indication parameter is contained in an AS message, for example, the second indication parameter is contained in an RRC message.

Based on a cause of the original "UE Policy Container" in the downlink NAS message and the uplink NAS message and the newly-added seventh parameter, in the UCU procedure, all of the terminal, the base station and the AMF entity can preferentially process the received message containing the terminal policy, improving a configuration speed of the terminal policy.

As shown in FIG. 7, in the UCU procedure, when the terminal is in an idle state, the network side needs to trigger the terminal to return to a connected state, that is, the AMF entity needs to send a paging message to the terminal through the base station.

Figure 9:
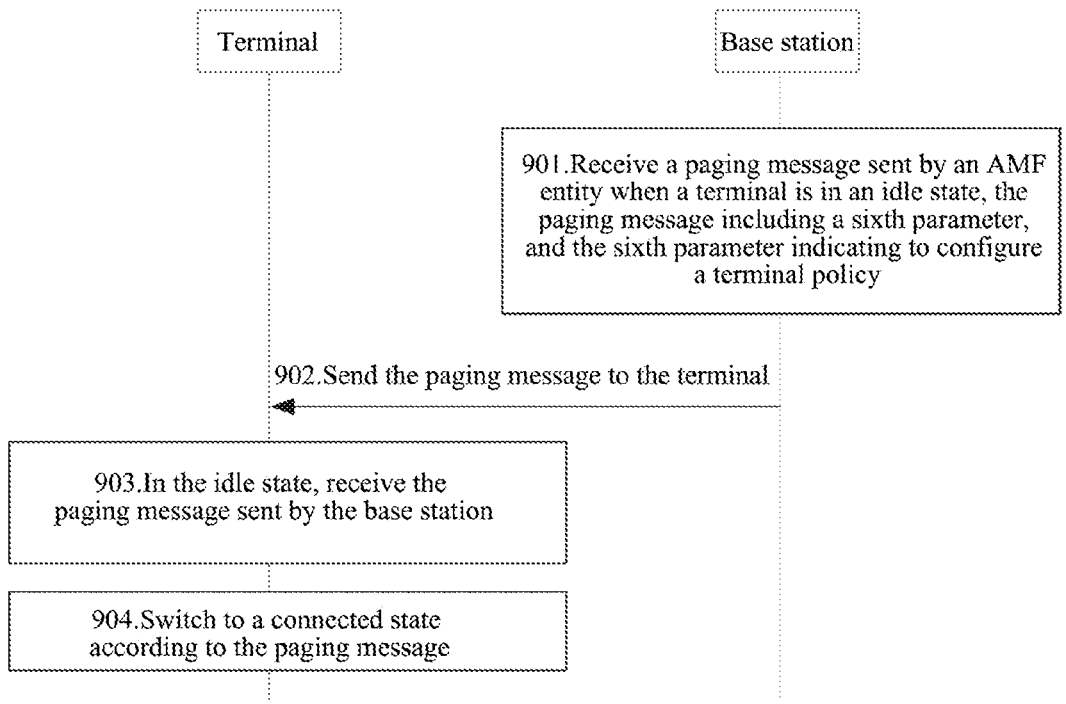
FIG. 9 shows a method flow chart of a method for configuring a terminal policy provided by another implementation of the present disclosure.

Please refer to FIG. 9, which shows a flow chart of a method for configuring a terminal policy provided by another implementation of the present disclosure. In the implementation, the method is applied to the base station in the communication system shown in FIG. 1 as an example for illustration. The method includes the following acts 901 to 904.

In act 901, a base station receives a paging message sent by an AMF entity when a terminal is in an idle state, wherein the paging message includes a sixth parameter, and the sixth parameter indicates to configure a terminal policy.

To enable the terminal to know that a purpose of paging is to configure the terminal policy, the paging message sent by the AMF entity contains the sixth parameter indicating to configure the terminal policy. In a possible implementation, the sixth parameter in the paging message is added by the AMF entity according to a policy configuration indication parameter coming from a PCF entity. For example, the Namf_Communication_N1N2MessageTransfer sent by the PCF entity to the AMF entity contains a policy configuration indication parameter.

With regard to a setting mode of the sixth parameter, optionally, the sixth parameter is located in a Message Type field or a newly-added field of the paging message, which is not limited in this implementation.

In act 902, the base station sends the paging message to the terminal.

To enable the base station to know that a purpose of sending the paging message is to return the terminal to a connected state, so as to receive the terminal policy configured by the PCF entity, in a possible implementation, a paging priority of the paging message is higher than that of the paging performed for other ordinary data, and the paging priority is set by the AMF entity.

Accordingly, after receiving the paging message, the base station preferentially sends the paging message to the terminal according to the paging priority of the paging message, improving a speed at which the terminal enters the connected state.

Optionally, the AMF entity sets the paging priority of the paging message according to indication of the PCF entity. For example, the PCF entity indicates the paging priority through Namf_Communication_N1N2MessageTransfer.

In an exemplary example, a message format of the paging message is shown in Table 6.

In act 904, the terminal switches to a connected state according to the paging message. In a possible implementation, after receiving the paging message and when detecting that the paging message contains the sixth parameter, the terminal determines that the paging message is used for configuring a terminal policy, and thus preferentially responds to the paging message and switches from the idle state to the connected state.

Optionally, in the connected state, a procedure for the terminal to send a ServiceRequest message may refer to a procedure for the terminal to actively request configuration of the terminal policy in the above implementations, which is not described repeatedly here in this implementation.

Optionally, the terminal in the connected state receives a downlink NAS message and/or sends an uplink NAS message, thereby completing the configuration of the terminal policy.

In this implementation, when the terminal is in an idle state, the AMF entity enables the base station to send the paging message to the terminal as soon as possible by setting the paging priority of the paging message, improving a sending speed of the paging message in a scenario of configuring the terminal policy. And the AMF entity sets the sixth parameter indicating to configure the terminal policy in the paging message, so that the terminal can resume the connected state as soon as possible according to the paging message, further improving a speed of subsequent configuration of the terminal policy.

It should be noted that in the above implementations, the acts performed by the terminal may be independently implemented as the method for configuring the terminal policy at the terminal side, the acts performed by the base station may be independently implemented as the method for configuring the terminal policy at the base station side, the acts performed by the AMF entity may be independently implemented as the method for configuring the terminal policy at the AMF entity side, and the acts performed by the PCF entity may be independently implemented as the method for configuring the terminal policy at the PCF entity side, which are not described repeatedly here in the implementations of the present disclosure.

TABLE 6

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| UE Paging Identity | M | | 9.3.3.18 | | YES | ignore |
| Paging DRX | O | | 9.3.1.90 | | YES | ignore |
| TAI List for Paging | | 1 | | | YES | ignore |
| >TAI List for Paging Item | | 1 ... <maxnoofTAIforPaging> | | | — | |
| >>TAI | M | | 9.3.3.11 | | — | |
| Paging Priority | O | | 9.3.1.78 | | YES | ignore |
| UE Radio Capability for Paging | O | | 9.3.1.68 | | YES | ignore |
| Assistance Data for Paging | O | | 9.3.1.69 | | YES | ignore |
| Paging Origin | O | | 9.3.3.22 | | YES | ignore |

In an exemplary example, Paging Priority corresponds to several priorities (PrioLevel1, PrioLevel2, PrioLevel3, PrioLevel4 . . . ), and the AMF entity sets Paging Priority as a preset level higher than a level threshold. For example, the preset level is PrioLevel2.

In act 903, the terminal in the idle state receives the paging message sent by the base station.

The following is device implementations of the implementations of the present disclosure. The parts which are not described in detail in the device implementations, may refer to the technical details disclosed in the above method implementations.

Figure 10:
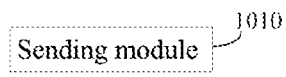
FIG. 10 shows a schematic diagram of structure of a device for configuring a terminal policy provided by an implementation of the present disclosure.

Please refer to FIG. 10, which shows a schematic diagram of structure of a device for configuring a terminal policy provided by an implementation of the present disclosure. The device may be embodied as all or a part of a terminal through software, hardware, or a combination of the software and hardware. The device includes a sending module 1010.

The sending module 1010 is configured to send, under an idle state, a radio resource control (RRC) setup request to a base station.

The sending module 1010 is further configured to send a non-access stratum (NAS) message to the base station, wherein at least one of the RRC setup request and the NAS message contains a preset parameter, and the preset parameter indicates to configure a terminal policy; and/or, the sending module 1010 is further configured to send, under a connected state, a NAS message to a base station through a signaling radio bearer (SRB), wherein the NAS message contains a preset parameter, and the preset parameter indicates to configure a terminal policy.

In a possible implementation, the preset parameter includes a first parameter, and the RRC setup request contains the first parameter, and the first parameter indicates that a cause for establishing an RRC connection is to configure the terminal policy.

In a possible implementation, the first parameter is determined by a NAS of a terminal and indicated to an AS.

In a possible implementation, the NAS message is an existing NAS message; the preset parameter includes a third parameter, and the third parameter is located in a Service Type field of the NAS message.

In a possible implementation, the NAS message is a new NAS message; the preset parameter includes a fourth parameter, and the fourth parameter is located in a Message Type field of the NAS message; or, the preset parameter includes a third parameter and a fourth parameter, the fourth parameter is located in a Message Type field of the NAS message, and the third parameter is located in a Service Type field of the NAS message.

In a possible implementation, the NAS message is contained in an RRC setup complete message.

In a possible implementation, the NAS message includes a container, and the container is transmitted transparently from the terminal to a packet control function (PCF) entity; the preset parameter includes a fifth parameter, and the fifth parameter is located in the container of the NAS message.

In a possible implementation, when a SIM card of the terminal is unchanged, the container of the NAS message contains a policy identifier I, and the policy identifier is used for indicating policy information and/or a policy type which are stored locally in the terminal; and when the SIM card of the terminal is changed, the policy identifier and the policy information corresponding to the policy identifier, which are stored locally in the terminal, are cleared, and the container of the NAS message does not contain the policy identifier.

Figure 11:
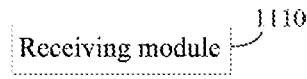
FIG. 11 shows a schematic diagram of structure of a device for configuring a terminal policy provided by another implementation of the present disclosure.

Please refer to FIG. 11, which shows a schematic diagram of structure of a device for configuring a terminal policy provided by another implementation of the present disclosure. The device may be embodied as all or a part of a base station through software, hardware, or a combination of the software and hardware. The device includes a receiving module 1110.

The receiving module 1110 is configured to receive a radio resource control (RRC) setup request sent by a terminal in an idle state.

The receiving module 1110 is further configured to receive a non-access stratum (NAS) message sent by the terminal, wherein at least one of the RRC setup request and the NAS message contains a preset parameter, and the preset parameter indicates to configure a terminal policy; and/or, the receiving module 1110 is further configured to receive a NAS message sent by a terminal in a connected state through a signaling radio bearer (SRB), wherein the NAS message contains a preset parameter, and the preset parameter indicates to configure a terminal policy.

In a possible implementation, the preset parameter includes a first parameter which indicates that a cause for establishing an RRC connection is to configure the terminal policy.

In a possible implementation, the device further includes a processing module, configured to preferentially respond to the RRC setup request.

In a possible implementation, the first parameter is determined by a NAS of the terminal and indicated to an AS.

In a possible implementation, the NAS message is an existing NAS message; the preset parameter includes a third parameter, and the third parameter is located in a Service Type field of the NAS message.

In a possible implementation, the NAS message is a new NAS message; the preset parameter includes a fourth parameter, and the fourth parameter is located in a Message Type field of the NAS message; or, the preset parameter includes a third parameter and a fourth parameter, wherein the fourth parameter is located in a Message Type field of the NAS message, and the third parameter is located in a Service Type field of the NAS message.

In a possible implementation, the device further includes a sending module, configured to send an INITIAL UE CONTEXT message to an access and mobility management (AMF) entity, and the INITIAL UE CONTEXT message contains the NAS message and the first parameter.

In a possible implementation, the NAS message includes a container, and the container is transmitted transparently from the terminal to a packet control function (PCF) entity; the preset parameter includes a fifth parameter, and the fifth parameter is located in the container of the NAS message.

In a possible implementation, when a SIM card of the terminal is unchanged, the container of the NAS message contains a policy identifier, and the policy identifier is used for indicating policy information and/or a policy type which are stored locally in the terminal; and when the SIM card of the terminal is changed, the policy identifier and the policy information corresponding to the policy identifier, which are stored locally in the terminal, are cleared, and the container of the NAS message does not contain the policy identifier.

Figure 12:
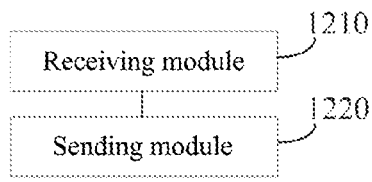
FIG. 12 shows a schematic diagram of structure of a device for configuring a terminal policy provided by another implementation of the present disclosure.

Please refer to FIG. 12, which shows a schematic diagram of structure of a device for configuring a terminal policy provided by another implementation of the present disclosure. The device may be embodied as all or a part of an AMF entity through software, hardware, or a combination of the software and hardware. The device includes a receiving module 1210 and a sending module 1220.

The receiving module 1210 is configured to receive an INITIAL UE CONTEXT message sent by a base station, wherein the INITIAL UE CONTEXT message includes a NAS message sent by a terminal to the base station.

The sending module 1220 is configured to preferentially send a container in the NAS message to a packet control function (PCF) entity if the INITIAL UE CONTEXT message contains a preset parameter, the preset parameter indicates to configure a terminal policy.

In a possible implementation, the NAS message is an existing NAS message; the preset parameter includes a third parameter, and the third parameter is located in a Service Type field of the NAS message.

In a possible implementation, the NAS message is a new NAS message; the preset parameter includes a fourth parameter, and the fourth parameter is located in a Message Type field of the NAS message; or, the preset parameter includes a third parameter and a fourth parameter, the fourth parameter is located in a Message Type field of the NAS message, and the third parameter is located in a Service Type field of the NAS message.

In a possible implementation, the preset parameter is a first parameter contained in a radio resource control (RRC) setup request sent by the terminal to the base station, and the first parameter indicates that a cause for establishing an RRC connection is to configure the terminal policy.

Figure 13:
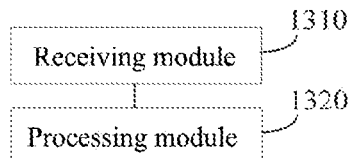
FIG. 13 shows a schematic diagram of structure of a device for configuring a terminal policy provided by another implementation of the present disclosure.

Please refer to FIG. 13, which shows a schematic diagram of structure of a device for configuring a terminal policy provided by another implementation of the present disclosure. The device may be embodied as all or a part of a PCF entity through software, hardware, or a combination of the software and hardware. The device includes a receiving module 1310 and a processing module 1320.

The receiving module 1310 is configured to receive a container sent by an access and mobility management function (AMF) entity, wherein the container is located in a non-access stratum (NAS) message sent by a terminal.

The processing module 1320 is configured to preferentially write a terminal policy into the container if the container contains a preset parameter, and the preset parameter indicates to configure the terminal policy.

In a possible implementation, when a SIM card of the terminal is unchanged, the container contains a policy identifier, and the policy identifier is used for indicating policy information and/or a policy type which are stored locally in the terminal; and when the SIM card of the terminal is changed, the policy identifier and the policy information corresponding to the policy identifier, which are stored locally in the terminal, are cleared, and the container does not contain the policy identifier.

Figure 14:
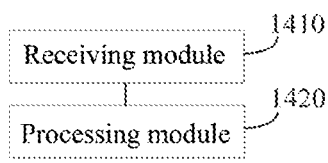
FIG. 14 shows a schematic diagram of structure of a device for configuring a terminal policy provided by another implementation of the present disclosure.

Please refer to FIG. 14, which shows a schematic diagram of structure of a device for configuring a terminal policy provided by another implementation of the present disclosure. The device may be embodied as all or a part of a terminal through software, hardware, or a combination of the software and hardware. The device includes a receiving module 1410 and a processing module 1420.

The receiving module 1410 is configured to receive, under an idle state, a paging message sent by a base station, the paging message includes a sixth parameter, and the sixth parameter indicates that the paging message is used for configuring a terminal policy.

The processing module 1420 is configured to switch to a connected state according to the paging message.

In a possible implementation, the processing module 1420 is further configured to preferentially respond to the paging message.

In a possible implementation, the receiving module 1410 is configured to receive a downlink NAS message, under the connected state.

The device further includes a sending module configured to send an uplink NAS message, under the connected state.

Figure 15:
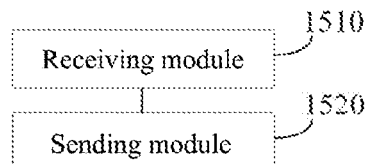
FIG. 15 shows a schematic diagram of structure of a device for configuring a terminal policy provided by another implementation of the present disclosure.

Please refer to FIG. 15, which shows a schematic diagram of structure of a device for configuring a terminal policy provided by another implementation of the present disclosure. The device may be embodied as all or a part of a base station through software, hardware, or a combination of the software and hardware. The device includes a receiving module 1510 and a sending module 1520.

The receiving module 1510 is configured to receive a paging message sent by an access and mobility management function (AMF) entity when a terminal is in an idle state, the paging message includes a sixth parameter, and the sixth parameter indicates to configure a terminal policy.

The sending module 1520 is configured to send the paging message to the terminal.

In a possible implementation, the sending module 1520 is further configured to send preferentially the paging message to the terminal according to a paging priority of the paging message.

In a possible implementation, the sixth parameter in the paging message is added by the AMF entity according to a policy configuration indication parameter coming from a PCF entity.

Figure 16:
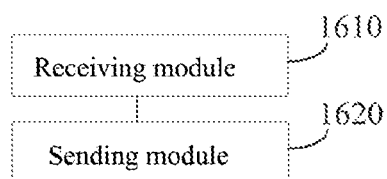
FIG. 16 shows a schematic diagram of structure of a device for configuring a terminal policy provided by another implementation of the present disclosure.

Please refer to FIG. 16, which shows a schematic diagram of structure of a device for configuring a terminal policy provided by another implementation of the present disclosure. The device may be embodied as all or a part of a base station through software, hardware, or a combination of the software and hardware. The device includes a receiving module 1610 and a sending module 1620.

The receiving module 1610 is configured to receive a first message sent by an access and mobility management function (AMF) entity, the first message contains a downlink non-access stratum (NAS) message, and the downlink NAS message contains a container coming from a packet control function (PCF) entity; and/or the sending module is configured to send a second message to an AMF entity, the second message contains an uplink NAS message, the uplink NAS message contains the container, and the container is sent to a PCF entity, and the first message and/or the second message contains a seventh parameter, and the seventh parameter indicates to configure a terminal policy.

In a possible implementation, the seventh parameter is located in a Message Type field of the first message and/or the second message; or, the seventh parameter is located in a newly-added field of the first message and/or the second message.

In a possible implementation, the seventh parameter is added by the AMF entity according to a first indication parameter coming from the PCF entity.

In a possible implementation, the seventh parameter is added by the base station according to a second indication parameter, and the second indication parameter comes from a terminal.

Figure 17:
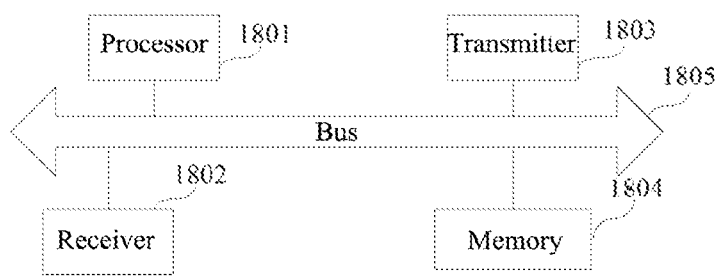
FIG. 17 shows a schematic diagram of structure of a terminal provided by an exemplary implementation of the present disclosure.

Please refer to FIG. 17, which shows a schematic diagram of structure of a terminal provided by an exemplary implementation of the present disclosure, and the terminal may be implemented as the terminal 11 in FIG. 1. The terminal includes a processor 1801, a receiver 1802, a transmitter 1803, a memory 1804 and a bus 1805.

The processor 1801 includes one or more processing cores. The processor 1801 performs various functional applications and information processing by running software programs and modules.

The receiver 1802 and the transmitter 1803 may be implemented as a communication component which may be a communication chip.

The memory 1804 is connected to the processor 1801 via the bus 1805.

The memory 1804 may be configured to store at least one instruction, and the processor 1801 is configured to execute the at least one instruction to implement various acts executed by the terminal in the above method implementations.

In addition, the memory 1804 may be implemented by any type of volatile or non-volatile storage device or a combination thereof, and the volatile or non-volatile storage device includes but is not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

Figure 18:
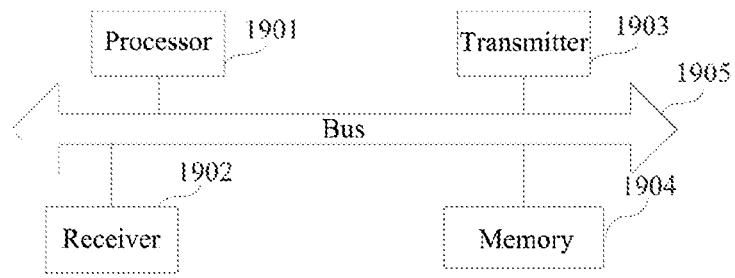
FIG. 18 shows a schematic diagram of structure of a base station provided by an exemplary implementation of the present disclosure.

Please refer to FIG. 18, which shows a schematic diagram of structure of a base station provided by an exemplary implementation of the present disclosure, and the base station may be implemented as the base station 120 in FIG. 1. The base station includes a processor 1901, a receiver 1902, a transmitter 1903, a memory 1904 and a bus 1905.

The processor 1901 includes one or more processing cores. The processor 1901 performs various functional applications and information processing by running software programs and modules.

The receiver 1902 and the transmitter 1903 may be implemented as a communication component which may be a communication chip.

The memory 1904 is connected to the processor 1901 via the bus 1905.

The memory 1904 may be configured to store at least one instruction, and the processor 1901 is configured to execute the at least one instruction to implement various acts executed by the base station in the above method implementations.

In addition, the memory 1904 may be implemented by any type of volatile or non-volatile storage device or a combination thereof, and the volatile or non-volatile storage device includes but is not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

Figure 19:
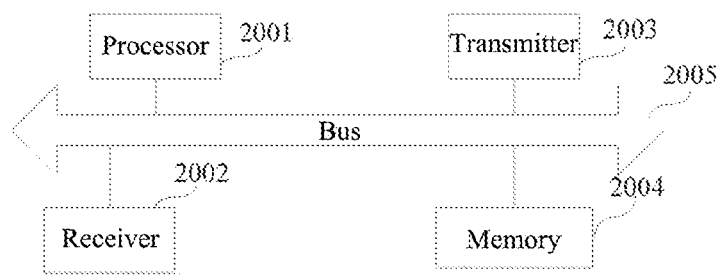
FIG. 19 shows a schematic diagram of structure of an AMF entity provided by an exemplary implementation of the present disclosure.

Please refer to FIG. 19, which shows a schematic diagram of structure of an AMF entity provided by an exemplary implementation of the present disclosure, and the AMF entity may be implemented as the AMF entity 131 in FIG. 1. The AMF entity includes a processor 2001, a receiver 2002, a transmitter 2003, a memory 2004 and a bus 2005.

The processor 2001 includes one or more processing cores. The processor 2001 performs various functional applications and information processing by running software programs and modules.

The receiver 2002 and the transmitter 2003 may be implemented as a communication component which may be a communication chip.

The memory 2004 is connected to the processor 2001 via the bus 2005.

The memory 2004 may be configured to store at least one instruction, and the processor 2001 is configured to execute the at least one instruction to implement various acts executed by the AMF entity in the above method implementations.

In addition, the memory 2004 may be implemented by any type of volatile or non-volatile storage device or a combination thereof, and the volatile or non-volatile storage device includes but is not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

Figure 20:
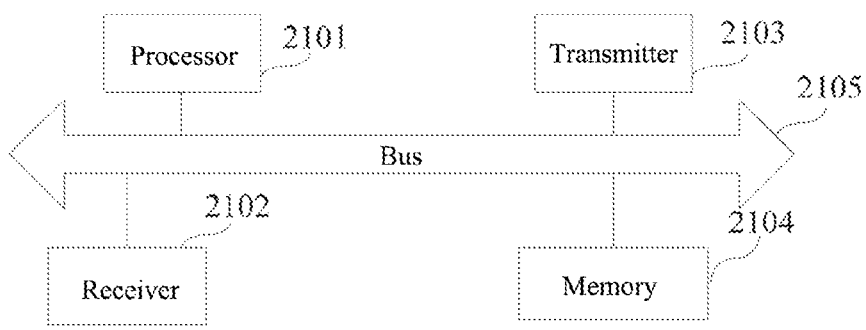
FIG. 20 shows a schematic diagram of structure of a PCF entity provided by an exemplary implementation of the present disclosure.

Please refer to FIG. 20, which shows a schematic diagram of structure of a PCF entity provided by an exemplary implementation of the present disclosure, and the PCF entity may be implemented as the PCF entity 132 in FIG. 1. The PCF entity includes a processor 2101, a receiver 2102, a transmitter 2103, a memory 2104 and a bus 2105.

The processor 2101 includes one or more processing cores. The processor 2101 performs various functional applications and information processing by running software programs and modules.

The receiver 2102 and the transmitter 2103 may be implemented as a communication component which may be a communication chip.

The memory 2104 is connected to the processor 2101 via the bus 2105.

The memory 2104 may be configured to store at least one instruction, and the processor 2101 is configured to execute the at least one instruction to implement various acts executed by the PCF entity in the above method implementations.

In addition, the memory 2104 may be implemented by any type of volatile or non-volatile storage device or a combination thereof, and the volatile or non-volatile storage device includes but is not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

The present disclosure provides a computer-readable storage medium in which at least one instruction is stored, and the at least one instruction is loaded and executed by the processor to implement the method for configuring the terminal policy provided by any of the above method implementations.

The present disclosure further provides a computer program product. When run on the terminal, the computer program product enables the terminal to implement the method for configuring the terminal policy provided by any of the above method implementations.

Those skilled in the art should realize that, in one or more examples described above, the functions described in implementations of the present disclosure may be implemented by using hardware, software, firmware or any combination thereof. When the present disclosure is implemented by software, the above functions may be stored in a computer readable medium or serve as one or multiple instructions or codes on the computer readable medium for transmission. The computer readable medium includes a computer storage medium and a communication medium, where the communication medium includes any medium for conveniently transmitting computer programs from one place to another place. The storage medium may be any available medium that a general-purpose computer or a special-purpose computer can access.

The above descriptions are only preferred implementations of the present disclosure and are not intended to limit the present disclosure. Any modification, equivalent substitution, improvement, etc. made within the spirit and principles of the present disclosure shall be comprised within the scope of protection of the present disclosure.

What we claim is:

1. A method for configuring a terminal policy, wherein the method is applied to a terminal, and the method comprises:
   in an idle state, sending a radio resource control (RRC) setup request to a base station, wherein the RRC setup request is used for requesting to establish, resume or reestablish an RRC connection;
   in response to establish, resume or reestablish the RRC connection, sending a non-access stratum (NAS) message to the base station, wherein the NAS message contains a first container, and the first container comprises a preset parameter, and the preset parameter indicates to configure a terminal policy; and/or,
   in a connected state, sending a NAS message to a base station through a signaling radio bearer (SRB), wherein the NAS message contains a second container, and the second container comprises a preset parameter, and the preset parameter indicates to configure a terminal policy,
   wherein the first container and the second container containing the preset parameter are configured to cause, a packet control function, PCF, entity to write the terminal policy into the container,
   wherein when requesting configuration of the terminal policy, a new value for a UE policy delivery message type field of the first container and the second container is specified as the preset parameter, wherein the newly added field value used as the preset parameter in the UE policy delivery message type field is 00000101, and
   wherein the first container and the second container are transmitted transparently from the terminal to the PCF entity through an access and mobility management function, AMF, entity, and an updated terminal policy is received by the terminal from the PCF entity.

2. The method according to claim 1, wherein in the idle state, the NAS message is contained in an RRC setup complete message.

3. The method according to claim 1, wherein
   when a Subscriber Identity Module (SIM) card of the terminal is unchanged, the first container and the second container of the NAS message contains a policy identifier, and the policy identifier is used for indicating policy information and/or a policy type which are stored locally in the terminal; and
   when the SIM card of the terminal is changed, the policy identifier and the policy information corresponding to the policy identifier, which are stored locally in the terminal, are cleared, and the first container and the second container of the NAS message does not contain the policy identifier.

4. The method according to claim 1, wherein the RRC setup request comprises a first parameter, and the first parameter indicates that a cause for establishing an RRC connection is to configure the terminal policy.

5. The method according to claim 4, wherein the first parameter is determined by a NAS of the terminal and indicated to an access stratum (AS).

6. The method according to claim 1, wherein the NAS message is an existing NAS message; and
   the preset parameter comprises a third parameter, and the third parameter is located in a Service Type field of the NAS message.

7. The method according to claim 1, wherein the NAS message is a new NAS message; and
   the preset parameter comprises a fourth parameter, and the fourth parameter is located in a Message Type field of the NAS message.

8. The method according to claim 1, wherein the preset parameter comprises a third parameter and a fourth parameter, wherein the fourth parameter is located in a Message Type field of the NAS message, and the third parameter is located in a Service Type field of the NAS message.

9. A terminal, comprising a processor and a transmitter, wherein the processor control the transmitter to:
   send, under an idle state, a radio resource control (RRC) setup request to a base station, wherein the RRC setup request is used for requesting to establish, resume or reestablish an RRC connection,
   in response to establish, resume or reestablish the RRC connection, send a non-access stratum (NAS) message to the base station, wherein the NAS message contains a first container, and the first container comprises a preset parameter, and the preset parameter indicates to configure the terminal policy; and/or,
   send, under a connected state, a NAS message to a base station through a signaling radio bearer (SRB), wherein the NAS message contains a second container, and the second container comprises a preset parameter, and the preset parameter indicates to configure the terminal policy,
   wherein the first container and the second container containing the preset parameter are configured to cause, a packet control function, PCF, entity to write the terminal policy into the container,
   wherein when requesting configuration of the terminal policy, a new value for a UE policy delivery message type field of the first container and the second container is specified as the preset parameter, wherein the newly added field value used as the preset parameter in the UE policy delivery message type field is 00000101, and
   wherein the first container and the second container are transmitted transparently from the terminal to the PCF entity through an access and mobility management function, AMF, entity, and an updated terminal policy is received by the terminal from the PCF entity.

10. The terminal according to claim 9, wherein in the idle state, the NAS message is contained in an RRC setup complete message.

11. The terminal according to claim 9, wherein
    when a Subscriber Identity Module (SIM) card of the terminal is unchanged, the first container and the second container of the NAS message contains a policy identifier, and the policy identifier is used for indicating policy information and/or a policy type which are stored locally in the terminal; and
    when the SIM card of the terminal is changed, the policy identifier and the policy information corresponding to the policy identifier, which are stored locally in the terminal, are cleared, and the first container and the second container of the NAS message does not contain the policy identifier.

12. The terminal according to claim 9, wherein the RRC setup request comprises a first parameter, and the first parameter indicates that a cause for establishing an RRC connection is to configure the terminal policy.

13. The terminal according to claim 12, wherein the first parameter is determined by a NAS of the terminal and indicated to an access stratum (AS).

14. The terminal according to claim 9, wherein the NAS message is an existing NAS message; and
    the preset parameter comprises a third parameter, and the third parameter is located in a Service Type field of the NAS message.

15. The terminal according to claim 9, wherein the NAS message is a new NAS message; and the preset parameter comprises a fourth parameter, and the fourth parameter is located in a Message Type field of the NAS message.

16. The terminal according to claim 9, wherein the preset parameter comprises a third parameter and a fourth parameter, wherein the fourth parameter is located in a Message Type field of the NAS message, and the third parameter is located in a Service Type field of the NAS message.

* * * * *